United States Patent [19]

Jamail et al.

[11] Patent Number: 5,471,443
[45] Date of Patent: Nov. 28, 1995

[54] METHOD OF SELECTIVELY CONCEALING MAGNETO-OPTICAL COMPACT DISK DATA FOR PLAYBACK UPON DEMAND

[75] Inventors: Randall Jamail, P.O. Box 980369, Houston, Tex. 77098; David Thompson, Houston, Tex.

[73] Assignee: Randall Jamail, Houston, Tex.

[21] Appl. No.: 301,040

[22] Filed: Sep. 6, 1994

Related U.S. Application Data

[63] Continuation of Ser. No. 172,849, Dec. 22, 1993, abandoned.

[51] Int. Cl.⁶ ................................................... G11B 17/22
[52] U.S. Cl. ................................. 369/32; 369/47; 369/33
[58] Field of Search .................... 369/32, 47–48, 369/44.39, 44.26, 30, 33, 284, 275.3, 275.2, 286, 100, 288, 13, 124, 54, 56, 58; 360/71, 72.1, 72.2, 78.4, 49

[56] References Cited

U.S. PATENT DOCUMENTS

| | | | |
|---|---|---|---|
| Re. 34,475 | 12/1993 | Custers et al. | 369/32 |
| 4,363,116 | 12/1982 | Kleuters et al. | 369/30 |
| 4,420,828 | 12/1983 | Yoshida et al. | 369/47 |
| 4,719,611 | 1/1988 | Miura et al. | 369/47 |
| 4,719,615 | 1/1988 | Feyrer et al. | 369/284 |
| 5,001,689 | 3/1991 | Bass et al. | 369/33 |
| 5,031,172 | 7/1991 | Umeda et al. | 369/275.1 |
| 5,036,511 | 7/1991 | Goldberg et al. | 369/284 |
| 5,059,473 | 10/1991 | Takahashi et al. | 428/162 |
| 5,080,946 | 1/1992 | Takagisi et al. | 428/64 |
| 5,117,416 | 5/1992 | Miyadera et al. | 369/284 |
| 5,157,646 | 10/1992 | Amemiya et al. | 369/47 |
| 5,200,948 | 4/1993 | Goldberg et al. | 369/284 |
| 5,255,260 | 10/1993 | Yamada et al. | 369/199 |
| 5,274,617 | 12/1993 | Terashima et al. | 369/54 |
| 5,293,568 | 3/1994 | Oshiba et al. | 369/32 |

OTHER PUBLICATIONS

Jan. 22, 1994; Billboard Newspaper, p. 20, Popular Uprising, Coverage of New and Developing Prospects For The Heatseekers Chart, "Initiated" Article, Geoff Mayfield and Brett Atwood.

*Primary Examiner*—Ali Neyzari
*Attorney, Agent, or Firm*—Alton W. Payne

[57] ABSTRACT

A method of prerecording data for later playback upon demand, the data operatively associated with a data storage medium having a first play location and a last play location, the storage medium adapted for use with a player or transcriber such that the media has a predefined begin play point from which the data begins to be removed from the medium by the player wherein the begin play point can be located at any location on the media, the method comprising the steps of (a) on the media, locating the begin play point sufficiently remote from the first play location for accepting data therebetween, (b) impressing data on the media between the first play location and the begin play point, (c) impressing data on the media between the begin play point and the end play point, (d) further impressing data on the media between the first play location and the last play location, (e) engaging the player for locating the begin play point, (f) further engaging the player to locate the first play location, (g) initiating the player to transcribe the data from the media between the first play location and the begin play point, and (h) allowing the player to transcribe past the begin play point for playing the data from the media between the first play location and the last play location.

1 Claim, 3 Drawing Sheets

| TRACK | INDEX | DESCRIPTION |
|---|---|---|
| 0 | 0 | Begin play point |
| 1 | 1 | Start Track 1 |
| 1 | 0 | Stop Track 2 |
| 2 | 1 | Start Track 1 |
| 2 | 0 | Stop Track 2 |
| ... | ... | ... |
| X | 0 | Stop Track X |

METHOD OF SELECTIVELY CONCEALING MAGNETO-OPTICAL COMPACT DISK DATA FOR PLAYBACK UPON DEMAND

This application is a continuation of application Ser. No. 08/172,849 filed Dec. 22, 1993, now abandoned.

FIELD OF THE INVENTION

The present invention relates to a method for recording information on a medium. Specifically, the present invention relates to an optical information recording medium and a method for recording information on such an optical information recording medium in a pre-gap zone.

BACKGROUND OF THE INVENTION

Data storage media are well known. Particularly, optical data storage media in the form of compact disks are well known. Compact disks are an alternative to long-playing records and magnetic tape cassettes. The disks with which consumers are familiar are optical read-only disks and the common disk player is designed specifically for this type of disk. These disks have a reflective surface containing pits which represent data in binary form. A description of these pits and how they function is provided by Watkinson, "The Art of Digital Audio," Focal Press, Chapter 13.

Compact disks are currently produced by a pressing process similar to the process used to produce conventional long playing records. The process is referred to herein as the "mastering" process. The mastering process starts by first polishing a plain glass optical disk. The disk has an outside diameter from 200 to 240 mm, a thickness of 6 mm and undergoes various cleaning and washing steps. The disk is then coated with a thin chrome film or coupling agent, a step taken to produce adhesion between the glass disk and a layer of photoresist, which is a photo-sensitive material. Data on a compact disk master tape are then transferred to the glass disk by a laser beam cutting method.

The glass disk is still completely flat after it is written on by the laser beam because pits are not formed until the glass is photographically developed. The disk surface is first made electrically conductive and then subjected to a nickel evaporation process. The disk, typically known as the glass master, then undergoes nickel electrocasting, a process which is similar to that used in making analog phonograph records. A series of metal replications follow, resulting in a disk called a stamper. The stamper is equivalent to a photographic negative in the sense that it is a reverse of the final compact disk; that is, there are now bumps where there were pits. This stamper is then used to make a pressing on a transparent polymer such as polyvinyl chloride, poly(ethyl-metacrylate) or a polycarbonate. The stamped surface is then plated with a reflective film such as aluminum or another metal, and finally a plastic coating is applied over the film to form a rigid structure.

The player operates by focusing a laser beam on the reflective metal through the substrate and then detecting reflected light. The optical properties of the substrate, such as its thickness and index of refraction, are thus critical to the player's detection systems and standard players are designed specifically with these parameters in mind.

The pits increase the optical path of the laser beam by an amount equivalent to a half wavelength, thereby producing destructive interference when combined with other (non-shifted) reflected beams. The presence of data thus takes the form of a drop in intensity of the reflected light. The detection system on a standard player is thus designed to require greater than 70% reflection when no destructive interference occurs and a modulation amplitude greater than 30% when data is present. These intensity limits, combined with the focusing parameters, set the criteria for the compact disks and other optical data storage media which can be read or played on such players. Media on which data can be recorded directly on and read directly from have a different configuration and operate under a somewhat different principle. One example is described in U.S. Pat. No. 4,719,615 (Feyrer et al.).

As optical information recording media of this type, compact disks (herein referred to simply as "CD") have been practically developed and widely used as optical information recording media of ROM (read only memory) type wherein pits are already formed on a light transmitting substrate by means of, for example, a press and a reflective layer of a metal is formed on the surface having such pits. As a further progress from such a ROM type, optical information recording media have been proposed on which information can be recorded by irradiating a laser beam to the substrate as the user requires. For Example, Japanese Unexamined Patent Publication No. 89605/1979 discloses an optical information recording medium which comprises at least a transparent substrate, a light absorptive layer containing a coloring matter formed on the substrate and a light reflective layer formed on the light absorptive layer, and on which information can optically be recorded and from which the recorded information can be reproduced.

To conduct the reproduction by commercially available CD players, optical recording media must be able to produce read-out signals which satisfy the CD standards which are accepted world wide. To satisfy the CD standards, typical requirements are that the reflectance is at least 70%; the block error rate is at most $3.0 \times 10^{-2}$; and when a push-pull method is employed for tracking pits, the push-pull valve is from 0.04 to 0.07.

However, none of the conventional recording media comprising a substrate having a pregroove, a light absorptive layer containing a coloring matter formed on the substrate and a light reflective layer formed on this absorptive layer, uses all the aspects of the CD format satisfying the various conditions prescribed by the CD standards.

It is, therefore, a feature of the present invention to provide a method of recording data for concealing the data for later playback upon demand.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein, a method of recording data for concealing the data for selective playback upon demand is provided. The data is operatively associated with a data storage medium having a first play location and a last play location. The storage medium is used with a player or transcriber such that the media has a predefined begin play point from which the data begins to be removed from the medium by the player. The begin play point can be located at any location on the media. The method comprises the steps of locating on the media the begin play point sufficiently remote from the first play location for accepting data therebetween. The data is impressed on the media between the first play location and the begin play point. The data is further impressed on the media between the first play location and the last play location. The player is engaged for locating the begin play point. The player is further engaged to locate the first play location. The player begins to transcribe the data from the media between the first play location and the begin play point. Thereafter, the player is allowed to transcribe past the begin play point for playing the data from the media between the first play location and the last play location.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

Figures 1, 3:
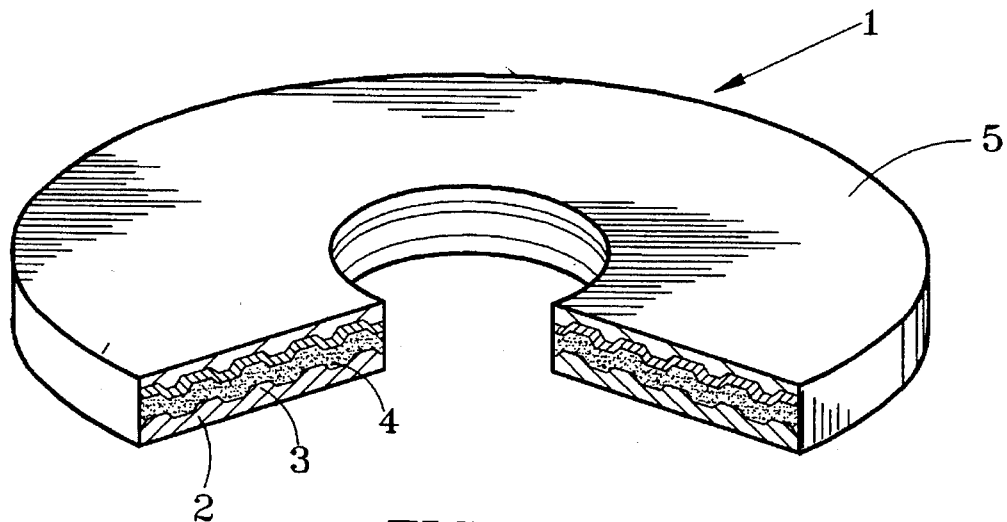
FIG. 1 is a partial cross section perspective view of a conventional compact disk (Prior Art).
FIG. 3 is a flow diagram illustrating the sequence of track counts on a conventional CD (Prior Art).

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

It is known in the industry to use a pre-gap on the compact disk. The pre-gap is a buffer between a start communication location on the CD and a first start mark indicative of a beginning location for the data recording area for the first track on the CD. The start communication location on the CD is typically closer to the central axis than the perimeter of the CD so that the CD is transcribed in an outward expanding radial direction. The pre-gap is provided, indeed required, on CD's to assure that the player can align itself with the start mark. Typically, the pre-gap is two (2) seconds on a CD. The pre-gap can be termed a buffer.

The CD player provides an indexing mechanism. The indexing mechanism reads from the CD a table of contents. The table of contents associated with the CD determines, for example, the start and finish location, and respective times for the different tracks or groupings of data on the CD. The CD table of contents information is read by the player and stored in memory. Based upon the table of contents information from the CD, the memory in the player knows, for example, where each track begins, each track ends and the length of the respective track. Typically, the table of contents has the track locations. Each track has a beginning index point and may have an ending index point. Typically, the track will begin at index 1 and end at index 0. Thus, the begin play point is at track 1, index 1. If there are X tracks on a CD, the last play location would be track X, index 0. The location identified by track 1, index 1 is the begin play point.

Heretofore, the pre-gap provided a location point for aligning the CD in the player. The CD players are preprogrammed to locate the end of the pre-gap location, i.e. the predefined begin play location. Thereafter, the table of contents is read by the player and the player is programmed to remember the locations of each of the tracks on the CD. It has been discovered to be advantageous to use the pre-gap as an auxiliary recording zone. Thus, a conventional CD could be divided into two (2) recording zones, the pre-gap zone and the normal zone.

Using the pre-gap zone provides a new realm of functionality to the standard CD player market. No changes or adjustments need to be made to the CD player whatsoever. Typically, a CD player can access the pre-gap by pressing and holding the rewind button so that the player scrolls to the beginning of a pre-track. The length of the pre-track can be set during the time the CD's are manufactured. For example, in a conventional CD, to use the method of the present invention, termed the Justice Soundboard™ pre-track, the CD is inserted and the play button is pressed. After the play button engages the CD and the CD is aligned, the table of contents is read and the first track is presented for processing, the rewind button is pressed and held providing that the player scrolls to the beginning of the Justice Soundboard™ pre-track. When the front of the pre-track location is reached, the button can be released, and the pre-track zone data will be transcribed by the player. This provides the availability of multiple independent track recording on a conventional CD.

Figure 2:
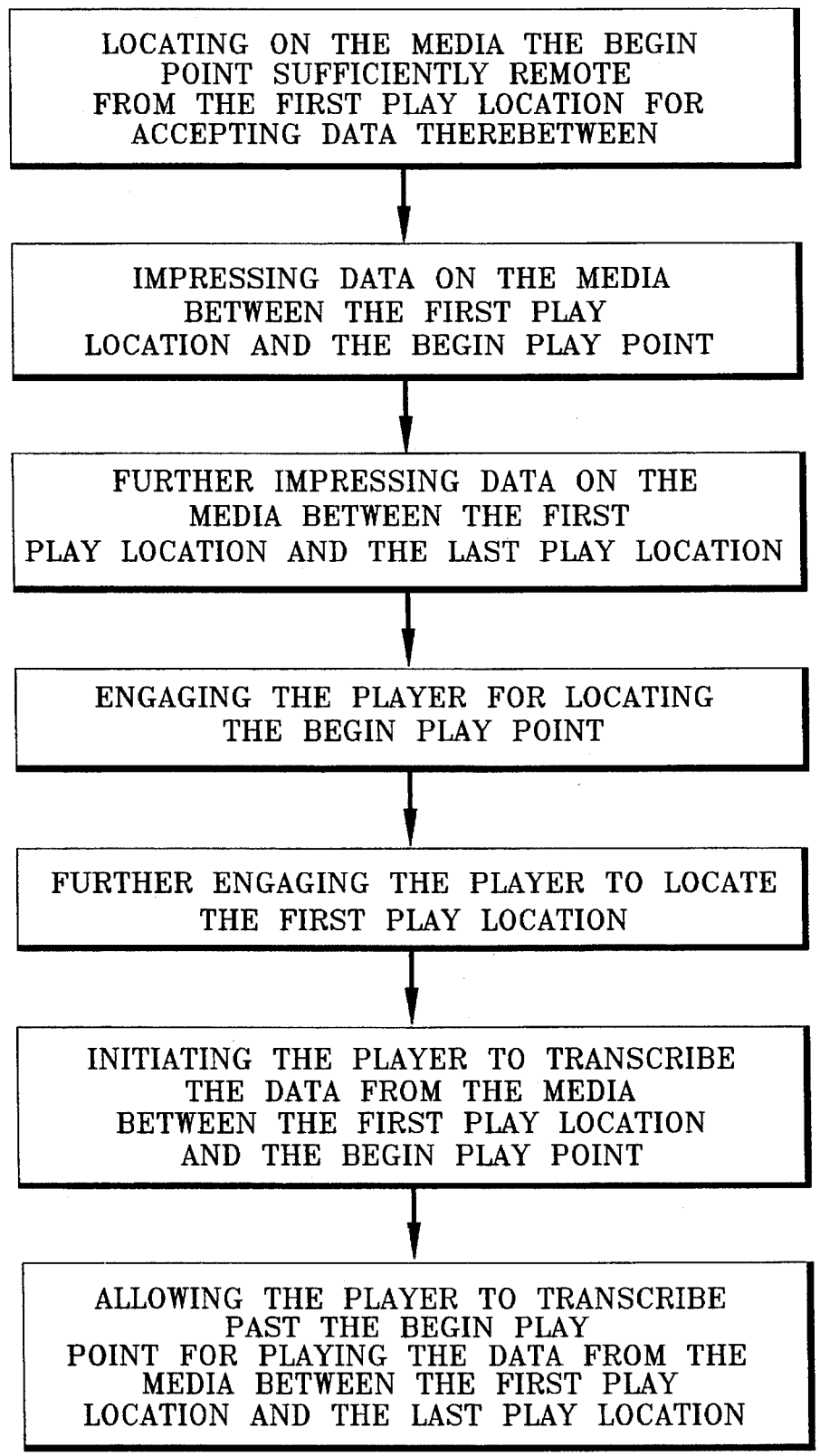
FIG. 2 is a flow diagram illustrating a preferred embodiment of the present invention.

FIG. 2 is a flow diagram illustrating the method of the present invention. The method provides for locating the begin play point on the medium sufficiently remote from the first play location for accepting data between the begin play point and the first play location. Data is impressed on the medium in the pretrack location, i.e., between the first play location and the begin play point. Then, data is placed on the media as normally done, for example, between the first play location and the last play location. Further, the method provides for engaging the player for locating the begin play point. The player can be further engaged to locate the first play location. Thereafter, the player is directed to transcribe the data from the media between the first play location and the begin play point, i.e., from the pre-gap zone. Thereafter, the player is provided access to transcribe the remaining data as normally would be transcribed from a CD by a player.

Figure 4:
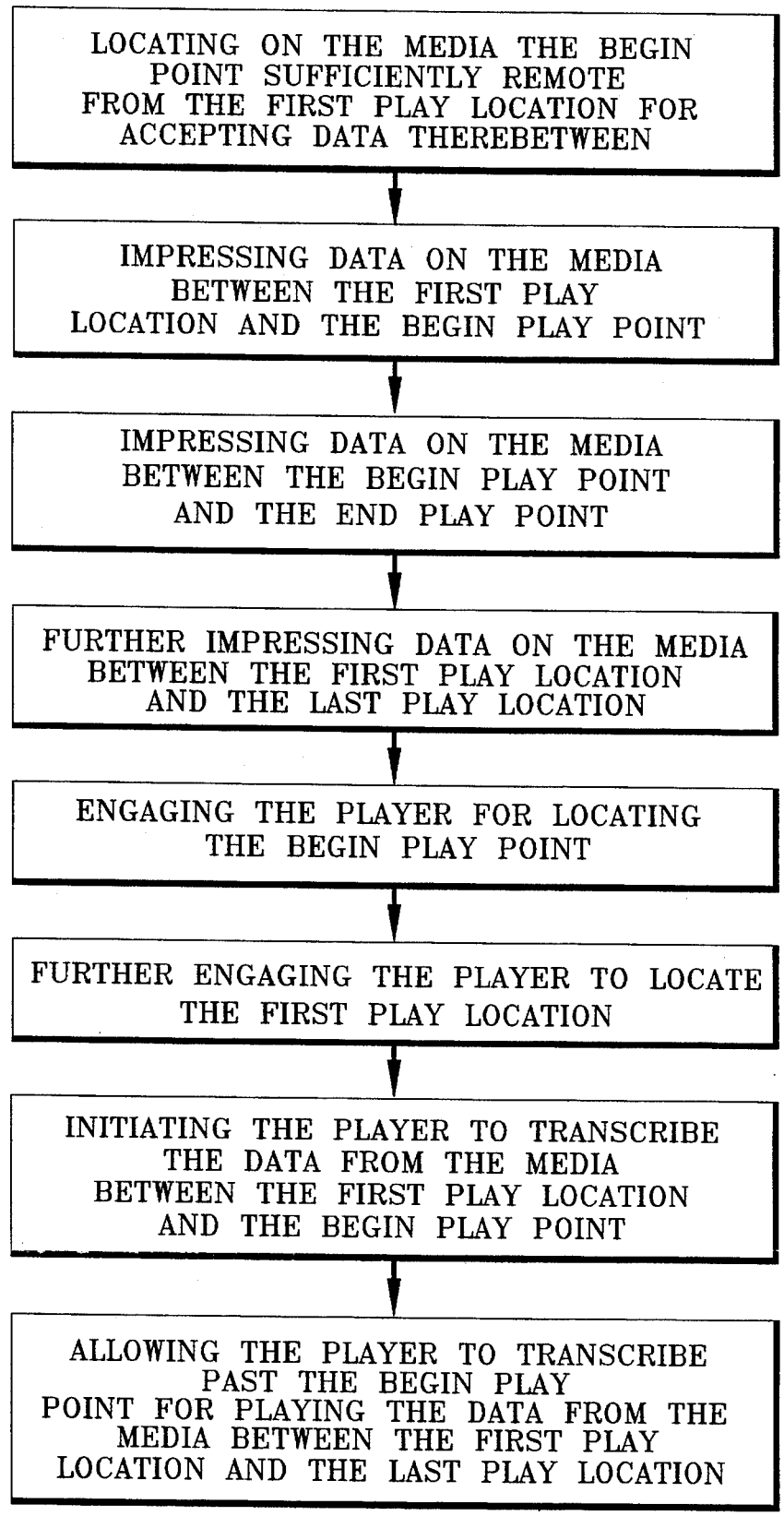
FIG. 4 is a flow diagram of another embodiment of the method of the present invention.

FIG. 4 illustrates another embodiment of the invention of the present application. The method identified in the flow diagram illustrated in FIG. 4 provides for locating the begin play point on the media sufficiently remote from the first play location for accepting data in a pretrack or pre-gap zone. Data is impressed on the pretrack or pre-gap zone which is located between the first play location and the begin play point. Further, as normally done on CD media, data is impressed between the begin play point and the end play point. Typically, this is done in a series of tracks. Thereafter, the player is engaged for locating the begin play point. After the begin play point is located, the player is further engaged to locate the first play location. The player can transcribe the data from the media between the first play location and the begin play location so that the pretrack data is transcribed from the pre-gap zone. Lastly, the player can transcribe the data as normally transcribed from between the first play location and the last play location.

It can be appreciated that this same technique can be used in any medium. It is not just the CD medium in which the technique can be incorporated.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. A method of recording data on a magneto-optical compact disk for concealing the data for selective playback upon express demand, the data operatively associated with the disk, the disk adapted for communication with a player or transcriber such that the disk has a start communication location and a terminate communication location with at least one track therebetween, each track including a data recording area for executing at least one of recording and reproducing the data, and each track including a start mark indicative of a beginning location for the data recording area for that track, the start communication location precedes the first start mark for the first track, and the stop communication location follows the last data recording area for the last track, the disk has a predefined begin play location which directs the player to begin playing at the begin play location such that the begin play location is at or in close proximity to the first start mark indicative of the beginning position for the first track, and the start mark for each track is identifiable by the player for determining the location on the disk to begin reproducing data for playback from the respective track, such that upon normal playback the disk is engaged for communication with the player at the begin play location and the data begins to be removed from the disk by the player at the first start mark of the first track which track contains the first data recording area, and further upon demand additional data can be removed from each data recording area on the disk by the player directed by the start mark for each track identified by communication between the player and the disk for determining the location on the disk to begin reproducing data for playback from the data recording area of each respective track, the method comprising the steps of:

(a) setting the position of the start communication location on the disk, (b) setting the position of the terminate communication location on the disk, (c) setting the position of the begin play location on the disk remote from the start communication location such that the begin play location initiates communication between the disk and the player, (d) disengaging along the disk in a direction remote from the begin play location and toward the start communication location sufficient to define a pre-gap track on the disk, the pre-gap track being between the begin play location and the start communication location for receiving data for recording and reproduction, the pre-gap track having a predetermined start location and end location based upon the amount of data to be impressed in the pre-gap track, (e) determining the size of the pre-gap track by at least one of time measurement along the disk or distance measurement along the disk, (f) impressing data on the disk within the pre-gap track for generating hidden data since the data in the pre-gap track is not affiliated with any combination of track and respective start mark which start mark is used by the player to receive direction for playing the respective track thus rendering the pre-gap track, and the associated hidden data, undetectable and concealed from the player, (g) impressing data on the disk in the data recording area associated with each combination of track and respective start mark such that the start mark comprises information indicative of a beginning position for the respective track, (h) engaging the player in communication with the disk for locating the begin play location, (i) further engaging the player to locate the start location of the pre-gap track, (j) demanding the player to play the hidden data from the pre-gap track between the start communication location and the begin play location, and (k) transcribing the player past the begin play location for playing the data from the disk between the begin play location and the terminate communication location.

* * * * *